June 2, 1931.  L. GOLDHAMMER  1,807,737
MOTION PICTURE PROJECTOR
Filed Jan. 22, 1929

Leo Goldhammer, Inventor,
By Philip S. Hopkins,
Attorney.

Patented June 2, 1931

1,807,737

UNITED STATES PATENT OFFICE

LEO GOLDHAMMER, OF MUNICH, GERMANY, ASSIGNOR TO AGFA ANSCO CORPORATION, OF BINGHAMTON, NEW YORK, A CORPORATION OF NEW YORK

MOTION PICTURE PROJECTOR

Application filed January 22, 1929, Serial No. 334,281, and in Germany January 20, 1928.

The present invention relates to a motion picture projector, more particularly to a projector suitable for the projection of films which differ in their dimensions, the distance between the perforations or the size of the picture.

Preferably in the case of domestic cinemas it is desirable to present with only one projector besides a film of certain dimensions other films of other dimensions, size of picture and kind of perforation. The scope of my present invention is to furnish such a projector.

My new projector is characterized by a readily interchangeable arrangement, which allows itself to be applied with a plurality of gripping devices to other sizes of pictures, or films of other dimensions. The parts necessary for this conversion are different for each variation of film dimensions, size of picture, and type of perforation, for instance fitted on a plate. The arrangement is so designed that by simply placing the plate on the driving mechanism of the projector the parts producing the forward movement engage with the driving shaft.

In the accompanying drawings one form of construction of the invention is illustrated by way of example. In these drawings:—

Figure 1:
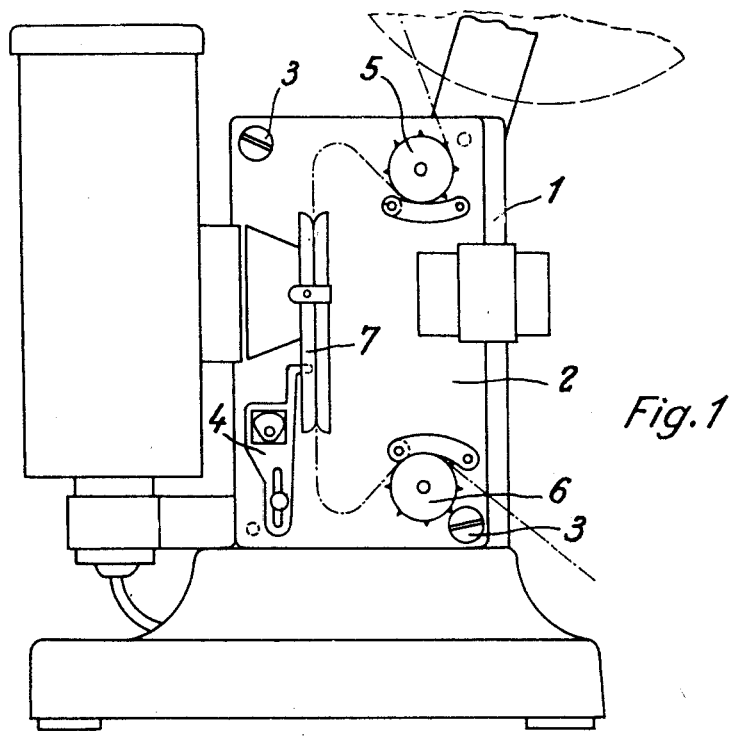
Fig. 1 is a perspective view of the projector.
Figure 2:
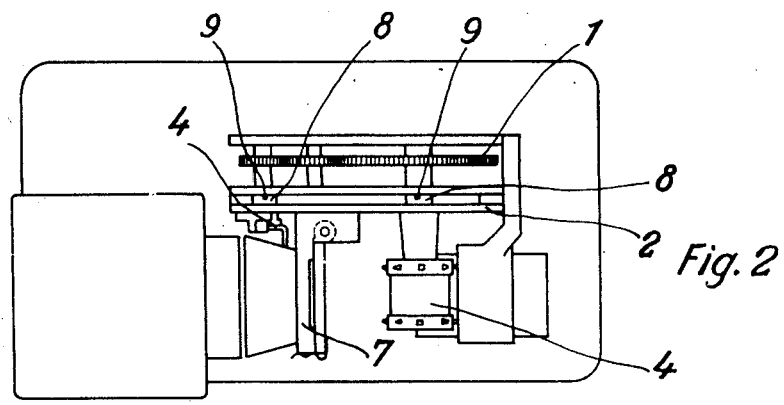
Fig. 2 is a plan of the projector.
Figure 3:
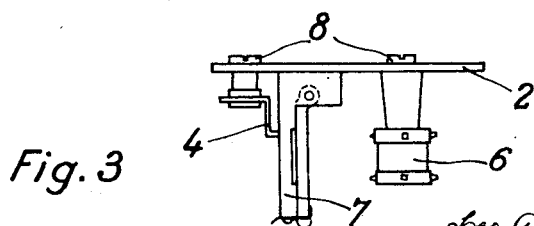
Fig. 3 is a plan of one of the changeable plates.

The plate 2 is fitted to the driving mechanism 1 by screws 3, or by similar means, in such a manner that it can be easily changed. To each of a number of such plates 2 are secured the film engaging members necessary for the projection of a film of particular dimensions, namely a gripping member 4, continuous feed sprockets 5, 6, picture gate 7, etc., in such manner that the ends 8 of the shafts that operate these parts project beyond the rear surface of the plate and are formed as coupling members. These shaft ends engage the ends 9 of the corresponding shafts of the driving mechanism, so that the forward movement can be effected by the driving mechanism. The coupling between the ends of the shafts can be formed as desired, for instance as pin-, tooth-, claw-coupling or the like. Substitution of one plate 2 for another enables the projector to be used for a film of different type.

I claim:

1. For a motion picture projector adapted to exhibit cinematographic films of different dimensions and provided with a driving mechanism, a plurality of plates of exactly the same size, mounted on each of the said plates in operative combination a film gate and means to forward a film band, said elements being of different size to operate with films of different dimensions, and means to secure such a plate easily interchangeable in the projector, and the film driving means in operative engagement with the said driving mechanism.

2. For a motion picture projector adapted to exhibit cinematographic films of different dimensions and provided with a driving mechanism, a plurality of plates of exactly the same size, mounted on each of the said plates in operative combination a gripping member, continuous-feed sprockets and a film gate, said elements being of different size to operate with films of different dimensions, and means to secure such a plate easily interchangeable in the projector, and the film driving means in operative engagement with the said driving mechanism.

3. For a motion picture projector adapted to exhibit cinematographic films of different dimensions and provided with a driving mechanism, a plurality of plates of exactly the same size, mounted on each of the said plates in operative combination a film gate and means to forward a film band, said elements being of different size to operate with films of different dimensions, in the said means shafts projecting beyond the rear surface of the said plate and provided with coupling members, and means to secure such a plate easily interchangeable in the projector and the ends of the projecting shafts in operative engagement with the said driving mechanism.

4. For a motion picture projector adapted to exhibit cinematographic films of different dimensions and provided with a driving mechanism, a plurality of plates of exactly the same size, mounted on each of the said plates in operative combination a claw member, continuous-feed sprockets and a film gate, said elements being of different size to operate with films of different dimensions, the said claw member and the said sprockets being actuated by shafts projecting beyond the rear surface of the said plate and being provided with a coupling member, and means to secure such a plate easily interchangeable in the projector and the ends of the projecting shafts in operative engagement with the said driving mechanism.

In testimony whereof, I affix my signature.

LEO GOLDHAMMER.